United States Patent
Numata et al.

(10) Patent No.: US 12,506,981 B2
(45) Date of Patent: Dec. 23, 2025

(54) PHOTOELECTRIC CONVERSION APPARATUS, METHOD FOR CONTROLLING PHOTOELECTRIC CONVERSION APPARATUS, AND STORAGE MEDIUM

(71) Applicant: CANON KABUSHIKI KAISHA, Tokyo (JP)

(72) Inventors: Aihiko Numata, Tokyo (JP); Suguru Hosono, Tokyo (JP); Toshiya Ishioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 18/585,575

(22) Filed: Feb. 23, 2024

(65) Prior Publication Data
US 2024/0292125 A1    Aug. 29, 2024

(30) Foreign Application Priority Data
Feb. 28, 2023 (JP) .................. 2023-029888

(51) Int. Cl.
*H04N 25/703* (2023.01)
*H04N 25/633* (2023.01)

(52) U.S. Cl.
CPC ......... *H04N 25/633* (2023.01); *H04N 25/703* (2023.01)

(58) Field of Classification Search
CPC .. H04N 25/633; H04N 25/703; H04N 25/773; H04N 25/706; H04N 25/709; H04N 25/75; H04N 25/766
See application file for complete search history.

(56) References Cited

U.S. PATENT DOCUMENTS

| | | | | |
|---|---|---|---|---|
| 6,061,092 | A | * | 5/2000 | Bakhle .......... H04N 23/60 348/E5.042 |
| 2006/0284988 | A1 | | 12/2006 | Wakui |
| 2009/0040328 | A1 | | 2/2009 | Suzuki |

(Continued)

FOREIGN PATENT DOCUMENTS

| | | |
|---|---|---|
| EP | 3499873 A2 | 6/2019 |
| JP | 2022106649 A | 7/2022 |
| WO | 2018142555 A1 | 8/2018 |

*Primary Examiner* — Twyler L Haskins
*Assistant Examiner* — Surafel Yilmakassaye
(74) *Attorney, Agent, or Firm* — Canon U.S.A., Inc. IP Division

(57) ABSTRACT

A photoelectric conversion apparatus includes a plurality of pixels including an effective pixel configured to receive light and an optical black pixel shielded from light, determination means for determining a correction value for correcting a signal value of the effective pixel based on a signal acquired from the optical black pixel, and output means for outputting an image using the correction value. The determination means determines the correction value based on a difference between a first signal value indicating a signal value of the optical black pixel in a state where a light-shielding portion is inserted in an optical path of an imaging optical system and a second signal value indicating a signal value of the effective pixel and a third signal value indicating a signal value of the optical black pixel in a state where the light-shielding portion is removed from the optical path of the imaging optical system.

13 Claims, 12 Drawing Sheets

(56) References Cited

U.S. PATENT DOCUMENTS

2012/0127338 A1* 5/2012 Suzuki ................ H04N 25/633  
                                                                              348/E5.037  
2020/0351464 A1* 11/2020 Ikedo ..................... H04N 25/51  
2022/0030186 A1 1/2022 Ogawa \* cited by examiner FIG.10A
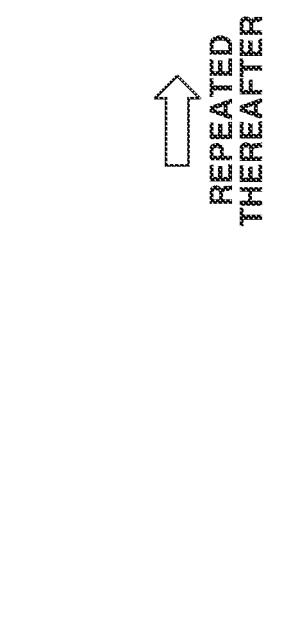
FIG.10B
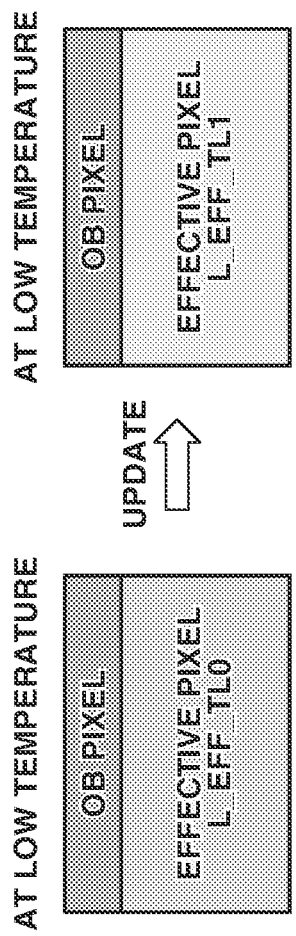
FIG.10C
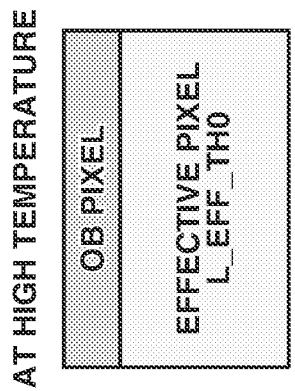
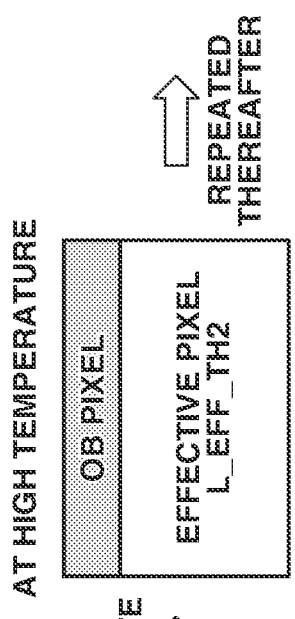

PHOTOELECTRIC CONVERSION APPARATUS, METHOD FOR CONTROLLING PHOTOELECTRIC CONVERSION APPARATUS, AND STORAGE MEDIUM

BACKGROUND OF THE INVENTION

Field of the Invention

The present invention relates to a photoelectric conversion apparatus.

Description of the Related Art

Japanese Patent Application Laid-Open No. 2022-106649 discusses a photoelectric conversion apparatus that digitally counts the number of photons incident on avalanche photodiodes (APDs) and outputs the count values as photoelectrically-converted digital signals from pixels.

Signals of pixels including APDs include, in addition to signals based on photoelectric conversion of incident light, signals caused by dark electrons generated at trap levels of the pixels. C. Zhang, "SPAD requirements from consumer electronics to automotive," Int. SPAD Sensor Workshop (2022) reports a phenomenon of an increase in dark current due to prolonged driving of a photoelectric conversion apparatus having APDs.

In a case where the dark current increases due to prolonged driving of the photoelectric conversion apparatus, a black level of signals deviates gradually. This leads to a decrease in image quality in a case where an image is formed using an output from the photoelectric conversion apparatus.

There is a known method of correcting a black level of effective pixels by using values of optical black pixels (OB pixels) placed outside a region of the effective pixels in an imaging apparatus using a commonly-used solid-state image sensor.

In a photoelectric conversion apparatus including an avalanche photodiode (APD), however, the greater the amount of light incident on the APD, the larger the avalanche current that flows, so that a new trap level may occur in pixels. Further, the possibility may increase that the large avalanche current causes an increase in temperature locally and dark electrons generated at the trap levels flow into an avalanche multiplication region.

In a case where the photoelectric conversion apparatus is driven for a long time, black levels of an effective pixel region with abundant incident light and OB pixels without incident light therefore deviate differently. This makes it difficult to correct the black level deviation of signals sufficiently in a case where the conventional black level correction using the OB pixels is used.

SUMMARY OF THE INVENTION

The present disclosure is directed to reducing black level deviation in a photoelectric conversion apparatus including an APD even in a case where the photoelectric conversion apparatus is driven for a long time.

According to an aspect of the present invention, a photoelectric conversion apparatus includes photoelectric conversion means including a plurality of pixels composed of an avalanche photodiode, the plurality of pixels including an effective pixel configured to receive light and an optical black pixel shielded from light, determination means for determining a correction value for correcting a signal value of the effective pixel based on a signal acquired from the optical black pixel, and output means for outputting an image using the correction value. The determination means determines the correction value based on a difference between a first signal value indicating a signal value of the optical black pixel in a state where a light-shielding portion is inserted in an optical path of an imaging optical system and a second signal value indicating a signal value of the effective pixel and a third signal value indicating a signal value of the optical black pixel in a state where the light-shielding portion is removed from the optical path of the imaging optical system.

Further features of the present invention will become apparent from the following description of embodiments with reference to the attached drawings.

BRIEF DESCRIPTION OF THE DRAWINGS

FIGS. 10A to 10C are diagrams illustrating signal processing of the photoelectric conversion apparatus according to the second embodiment.

DESCRIPTION OF THE EMBODIMENTS

Figure 1:
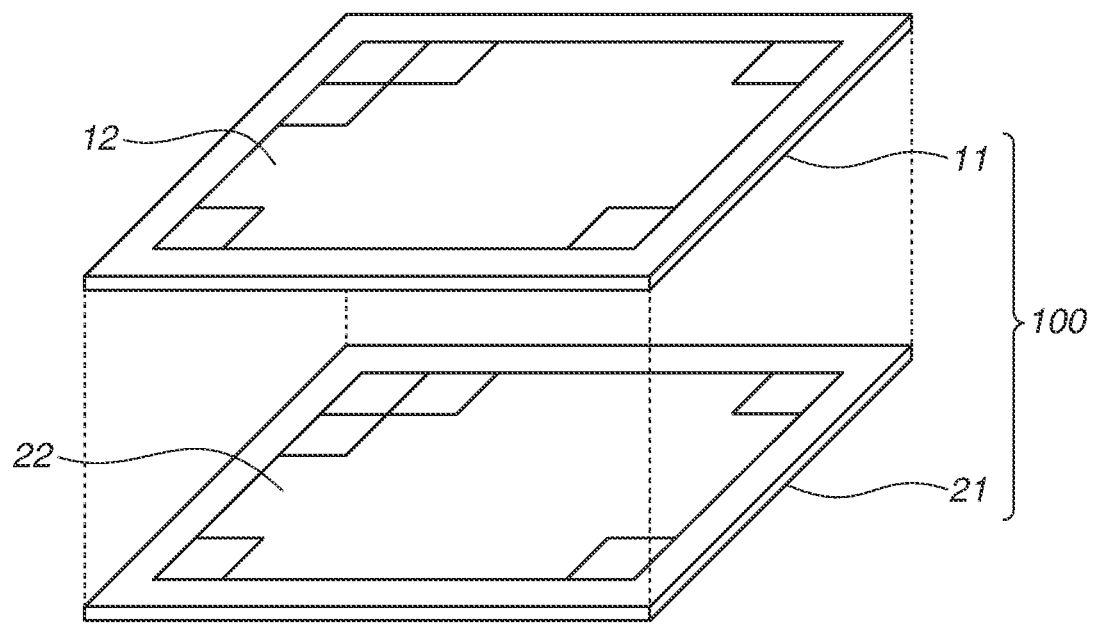
FIG. 1 is a diagram illustrating an example of a configuration of a photoelectric conversion element.

Various embodiments of the present invention will be described in detail below with reference to the drawings. It should be noted that the embodiments described below are merely example implementations of the present invention and the present invention is not limited to the embodiments described below. The features or elements recited in the claims, shown in the figures, discussed in the embodiments below, or the above summary may be implemented individually or as a combination of a plurality of elements or features thereof where necessary or where the combination of elements or features in a single embodiment is beneficial or where not expressly stated otherwise. Further, components, elements or features having a corresponding function are given the same reference numeral in all the drawings, and redundant descriptions thereof are omitted.

FIG. 1 is a diagram illustrating an example of a configuration of a photoelectric conversion element according to a first embodiment. A photoelectric conversion apparatus including a photoelectric conversion element 100 having a layered structure in which two substrates, e.g., a sensor substrate 11 and a circuit substrate 21, are layered and electrically connected together will be described below as an example.

Alternatively, a non-layered structure can also be used in which a configuration included in a sensor substrate and a configuration included in a circuit substrate are arranged on a common semiconductor layer. The sensor substrate 11 includes a pixel region 12. The circuit substrate 21 includes a circuit region 22 configured to process signals detected by the pixel region 12.

<Sensor Substrate>

Figure 2:
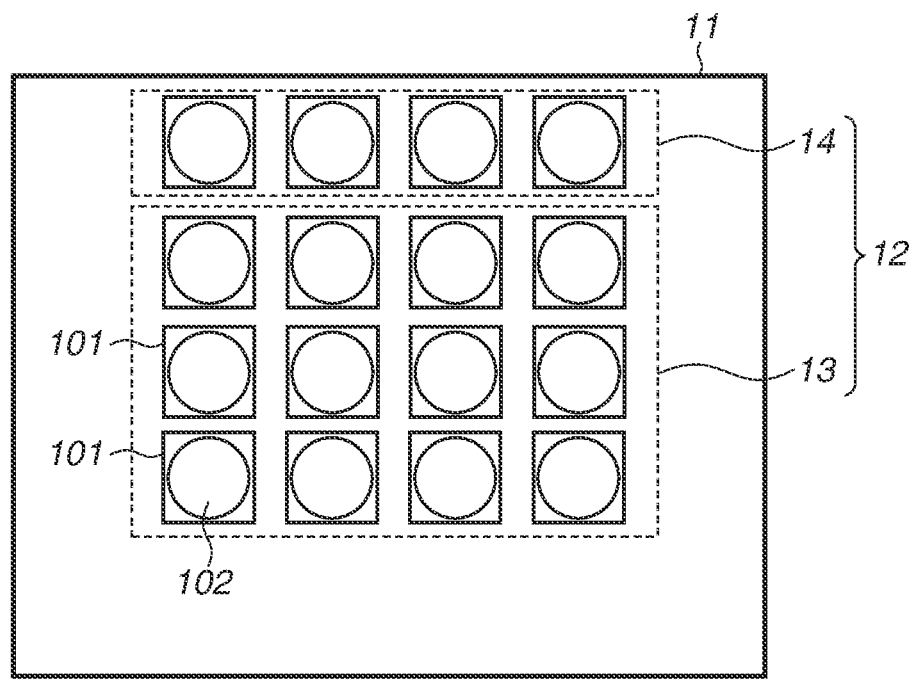
FIG. 2 is a diagram illustrating an example of a configuration of a sensor substrate.

FIG. 2 is a diagram illustrating an example of a configuration of the sensor substrate 11. The pixel region 12 of the sensor substrate 11 includes a plurality of pixels 101 arranged two-dimensionally across a plurality of row and column directions. The pixel region 12 includes an effective pixel region 13 and an optical black pixel (hereinafter, "OB pixel") region 14. Light can enter the effective pixel region 13 via an imaging optical system of the photoelectric conversion apparatus. The OB pixel region 14 includes a light-shielding member on each light incident surface of the pixels 101 to shield photoelectric conversion portions from incident light. Each pixel 101 includes a photoelectric conversion portion 102 including an avalanche photodiode (hereinafter, "APD"). The number of rows and the number of columns of the pixel array of the pixel region 12 are not particularly limited. Further, while FIG. 2 illustrates a case where the OB pixels are provided on an upper side of the effective pixel region 13, the OB pixels can be provided on a lower, right, or left side of the effective pixel region 13 or can be provided in a plurality of regions such as the upper and left sides.

While not illustrated in FIG. 2, the effective pixel region 13 and the OB pixels in the OB pixel region 14 are desirably separated and placed at a predetermined distance or greater from each other. That is to say, the OB pixels are spaced from the effective pixels by a predetermined distance to prevent or reduce miscounting in OB pixels. It is known that a phenomenon referred to as avalanche light emission occurs in a photoelectric conversion apparatus that includes an APD. In a case where avalanche light emission occurs, generated secondary electrons may enter an adjacent pixel, and this may increase a count number of a value of the adjacent pixel, which leads to miscounting. In a case where an effective pixel and an OB pixel are close to each other, there is therefore a possibility of an increase in count number of the OB pixel due to avalanche light emission caused by incident light on the effective pixel. Thus, the effective pixel region 13 and the OB pixels in the OB pixel region are desirably separated and placed at a predetermined distance or greater from each other to prevent miscounting in the OB pixels.

<Circuit Substrate>

Figure 3:
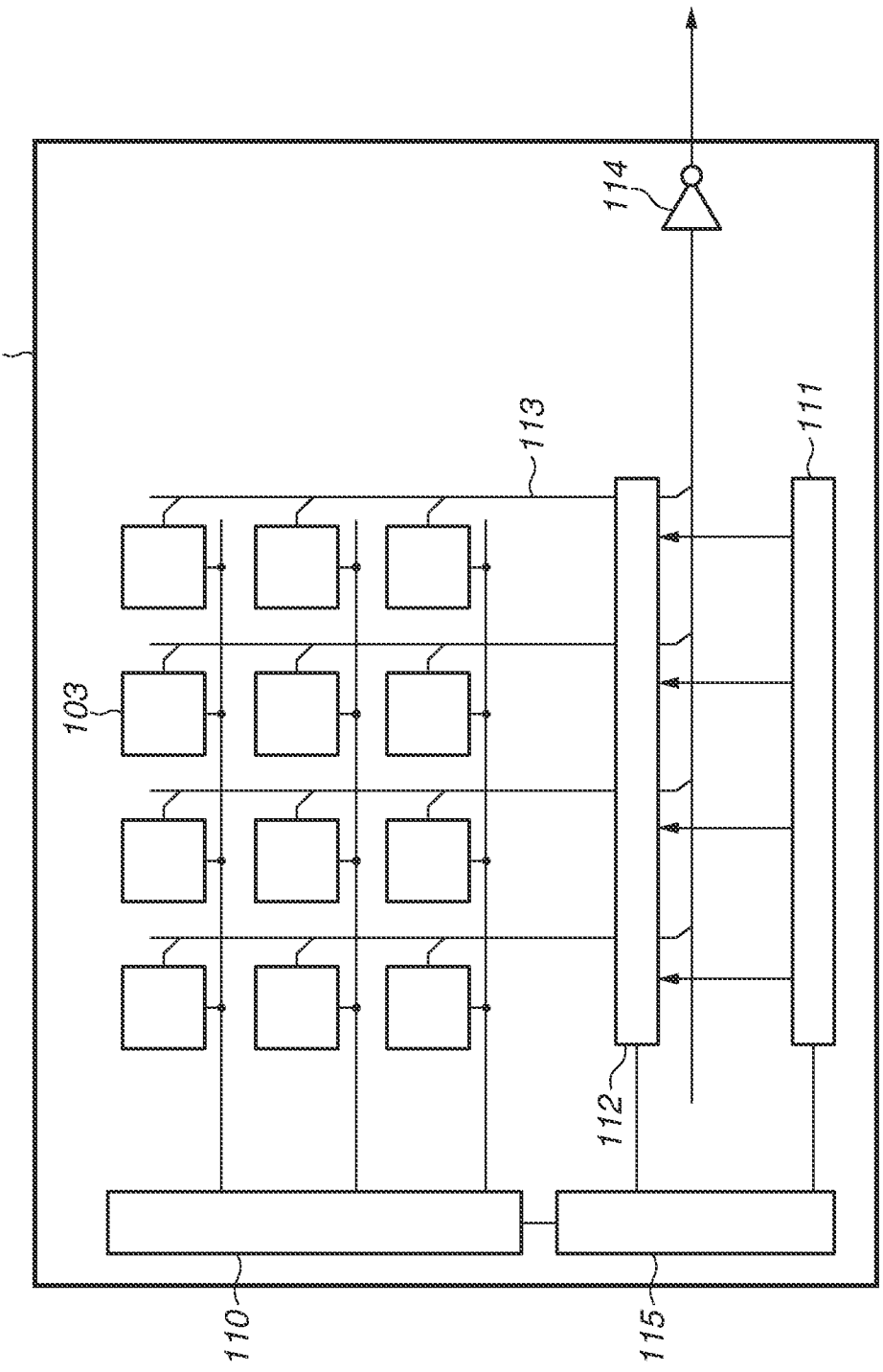
FIG. 3 is a block diagram illustrating an example of a configuration of a circuit substrate.

FIG. 3 is a diagram illustrating an example of a configuration of the circuit substrate 21. The circuit substrate 21 includes signal processing circuits 103, a reading circuit 112, a control pulse generation portion 115, a horizontal scan circuit 111, signal lines 113, and a vertical scan circuit 110. The signal processing circuits 103 process charge converted photoelectrically by the photoelectric conversion portions 102 of the pixels 101 including the OB pixels in FIG. 2.

The vertical scan circuit 110 receives control pulses supplied from the control pulse generation portion 115 and supplies control pulses to the pixels 101. The vertical scan circuit 110 consists of a logic circuit, such as a shift register and an address decoder. Signals output from the photoelectric conversion portions 102 of the pixels 101 are processed by the signal processing circuits 103. The signal processing circuits 103 include counters and memories, and digital values are stored in the memories. The horizontal scan circuit 111 inputs control pulses for sequentially selecting each column to the signal processing circuits 103 to read signals from memories of the pixels 101 storing digital signals. Signals are output from the signal processing circuits 103 of the pixels 101 selected by the vertical scan circuit 110 to the signal lines 113 for each selected column. The signals output to the signal lines 113 are output to the outside of a photoelectric conversion apparatus via an output circuit 114.

<Connection of Sensor Substrate and Circuit Substrate>

As illustrated in FIGS. 2 and 3, the plurality of signal processing circuits 103 is placed in a region that overlaps with the pixel region 12 in planar view. The vertical scan circuit 110, the horizontal scan circuit 111, the reading circuit 112, the output circuit 114, and the control pulse generation portion 115 are placed to overlap with regions between edges of the sensor substrate 11 and the pixel region 12 in planar view. In other words, the sensor substrate 11 includes the pixel region 12 and a non-pixel region around at least a portion of the pixel region 12. The vertical scan circuit 110, the horizontal scan circuit 111, the reading circuit 112, the output circuit 114, and the control pulse generation portion 115 are placed in regions that overlap with the non-pixel region in planar view.

The placement of the signal lines 113, the reading circuit 112, and the output circuit 114 is not limited to the placement illustrated in FIG. 3. For example, the signal lines 113 can extend in the row direction, and the reading circuit 112 can be placed at an end of the extending signal lines 113. Further, functions of a signal processing unit are not necessarily be provided one for each photoelectric conversion portion 102, and the plurality of photoelectric conversion portions 102 can share a single signal processing unit to perform signal processing sequentially.

<Equivalent Circuit of Pixel>

Figure 4:
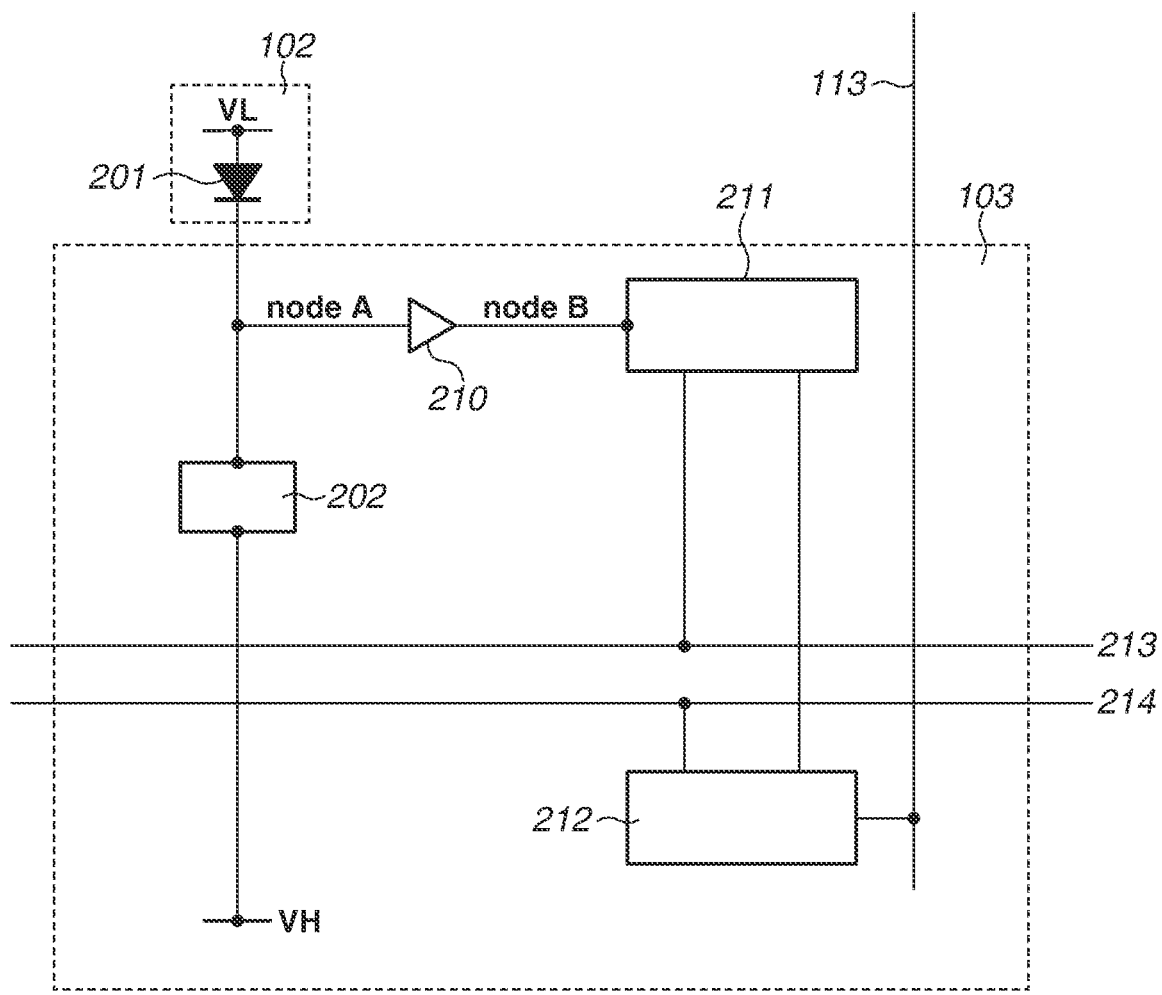
FIG. 4 is a diagram illustrating an example of an equivalent circuit of a pixel and a signal processing circuit corresponding to the pixel.

FIG. 4 is a diagram illustrating an equivalent circuit of the pixel 101 and the signal processing circuit 103 corresponding to each pixel 101 in FIGS. 2 and 3. An APD 201 generates a charge pair based on incident light by photoelectric conversion. One of two nodes of the APD 201 is connected to a power line to which a drive voltage VL (first voltage) is supplied. The other one of the two nodes of the APD 201 is connected to a power line to which a drive voltage VH (second voltage) higher than the voltage VL is supplied. In FIG. 4, one of the nodes of the APD 201 is an anode, and the other one of the nodes of the APD 201 is a cathode. A reverse bias voltage that causes the APD 201 to perform an avalanche multiplication operation is supplied to the anode and the cathode of the APD 201. By creating a state where the foregoing voltage is supplied, charge generated by incident light causes avalanche multiplication, and avalanche current is generated.

In the case where the reverse bias voltage is supplied, there are a Geiger mode and a linear mode. In the Geiger mode, the APD 201 is caused to operate at a voltage difference between the anode and the cathode that is greater than a breakdown voltage. In the linear mode, the APD 201 is caused to operate at a voltage difference between the anode and the cathode that is near the breakdown voltage or is lower than or equal to the breakdown voltage. The APD 201 that is caused to operate in the Geiger mode will be referred to as a single photon avalanche diode (SPAD). In the case of the SPAD, for example, the voltage VL (first voltage) is −30 V, and the voltage VH (second voltage) is 1 V.

A quenching element 202 is connected to the power line to which the drive voltage VH is supplied, and is also connected to one of the anode and the cathode of the APD 201. The quenching element 202 functions as a load circuit (quenching circuit) during signal multiplication caused by avalanche multiplication and has a function (quenching operation) of reducing the voltage supplied to the APD 201 to prevent avalanche multiplication. The quenching element 202 also has a function (recharge operation) of restoring the voltage supplied to the APD 201 to the drive voltage VH by passing a current corresponding to a voltage drop caused by the quenching operation.

The signal processing circuit 103 includes a waveform shaping portion 210, a counter circuit 211, and a selection circuit 212. While FIG. 4 illustrates a case where the signal processing circuit 103 includes the waveform shaping portion 210, the counter circuit 211, and the selection circuit 212, the signal processing circuit 103 is to include, in the present specification, at least one of the waveform shaping portion 210, the counter circuit 211, and the selection circuit 212.

The waveform shaping portion 210 shapes a voltage change in the cathode of the APD 201 that is acquired in detecting photons, and outputs a pulse signal. For example, an inverter circuit is used as the waveform shaping portion 210. While FIG. 4 illustrates a case where a single inverter is used as the waveform shaping portion 210, a circuit with a plurality of inverters connected in series can be used, or another circuit capable of producing a waveform shaping effect can also be used.

The counter circuit 211 counts pulse signals output from the waveform shaping portion 210 and stores the count values. In a case where a control pulse RES is supplied via a drive line 213, signals stored in the counter circuit 211 are reset.

A control pulse SEL is supplied from the vertical scan circuit 110 in FIG. 3 to the selection circuit 212 via a drive line 214 illustrated in FIG. 4 (not illustrated in FIG. 3) and switches the counter circuit 211 and the signal line 113 between electrical connection and disconnection. The selection circuit 212 includes, for example, a buffer circuit for outputting signals.

A switch such as a transistor can be provided between the quenching element 202 and the APD 201 or between the photoelectric conversion portion 102 and the signal processing circuit 103 to switch electrical connection. Similarly, the supply of the voltage VH or VL to the photoelectric conversion portion 102 can be switched electrically using a switch such as a transistor.

<Circuit Drive>

Figure 5:
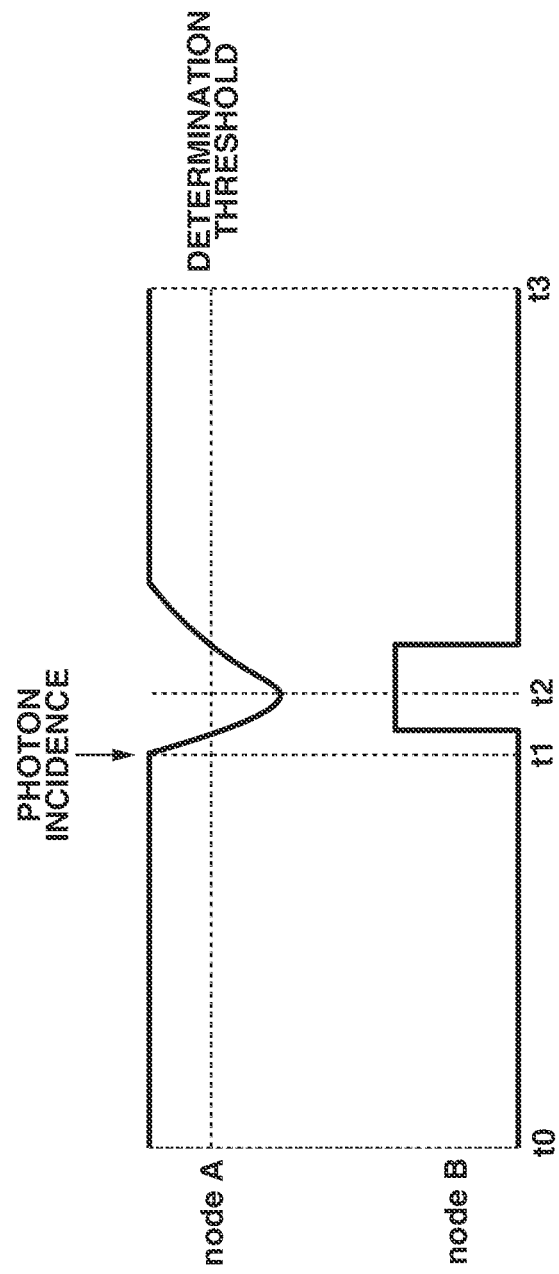
FIG. 5 is a diagram schematically illustrating a relationship between an avalanche photodiode (APD) operation and an output signal.

FIG. 5 is a diagram schematically illustrating a relationship between an APD operation and an output signal. Nodes A and B respectively indicate input and output sides of the waveform shaping portion 210. From time t0 to time t1, a potential difference VH−VL is applied to the APD 201. As photons are incident on the APD 201 at time t1, avalanche multiplication occurs in the APD 201, and an avalanche multiplication current flows in the quenching element 202 and the voltage of the node A drops. After the amount of voltage drop further increases and the potential difference applied to the APD 201 decreases, the avalanche multiplication in the APD 201 stops at time t2, and the voltage level of the node A does not drop beyond a predetermined value. Thereafter, from time t2 to time t3, a current compensating for voltage drop flows from the voltage VL into the node A, and at time t3, the node A stabilizes to the original potential level. At this time, part of the output waveform from the node A that exceeds a threshold is shaped by the waveform shaping portion 210, and the shaped part is output as a signal from the node B.

<System Block Diagram>

Figure 6:
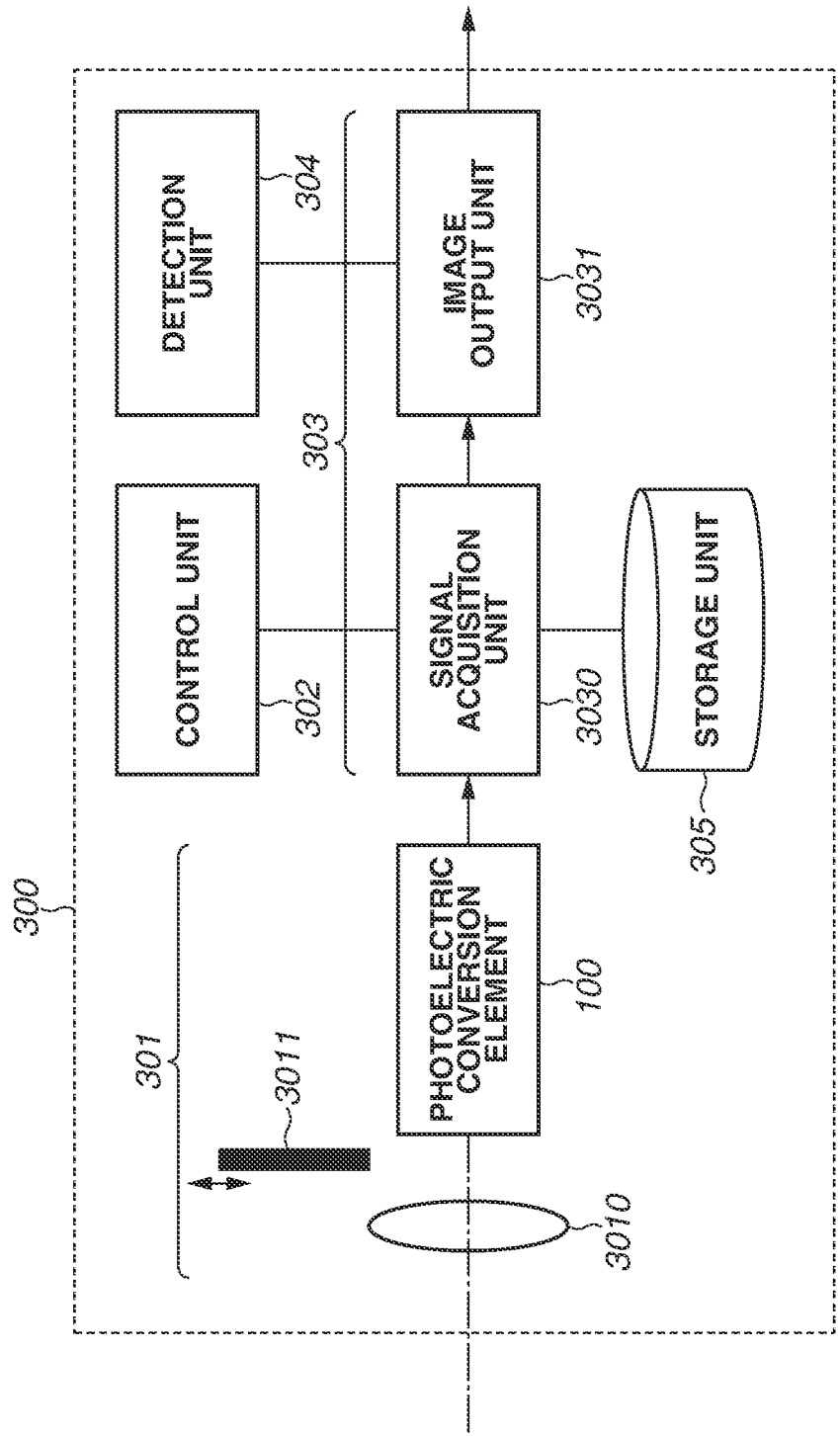
FIG. 6 is a block diagram illustrating an example of a functional configuration of a photoelectric conversion apparatus according to a first embodiment.

FIG. 6 is a system block diagram illustrating a photoelectric conversion apparatus 300 according to the first embodiment. Some of functional blocks illustrated in FIG. 6 are realized by causing a computer (e.g., a control unit 302 serving as a central processing unit (CPU)) of the photoelectric conversion apparatus 300 to execute computer programs stored in a memory (storage unit 305), which is a storage medium. Alternatively, some or all of the functional blocks can be realized using hardware. Examples of the hardware include a field programmable gate array (FPGA), a dedicated integrated circuit (application-specific integrated circuit (ASIC)), and a processor (reconfigurable processor, digital signal processor (DSP)) can be used. The functional blocks illustrated in FIG. 6 do not have to be enclosed in the same casing and can be formed as separate devices connected to each other via a signal path.

The photoelectric conversion apparatus 300 includes an imaging unit 301 (the photoelectric conversion element 100, an imaging optical system 3010, a light-shielding mechanism 3011 for shielding light entering the photoelectric conversion element 100), the control unit 302, a signal processing unit 303, the storage unit 305, and a detection unit 304. The signal processing unit 303 processes signals acquired by the photoelectric conversion element 100.

The imaging unit 301 includes the photoelectric conversion element 100, which outputs image signals, the imaging optical system 3010, and the light-shielding mechanism 3011 for shielding the photoelectric conversion element 100 from incident light. The photoelectric conversion element 100 includes a plurality of pixels composed of an APD and including effective pixels and OB pixels. The effective pixels receive light, and the OB pixels are shielded from light. The photoelectric conversion element 100 acquires signal values from the OB pixels and the effective pixels. The light-shielding mechanism 3011 also includes a light-shielding portion and a drive portion. The light-shielding portion is formed of a material such as a pigment that absorbs light. The drive portion controls an open/close state of the light-shielding portion 3011. The drive portion is composed of, for example, a galvanometer and controls an open/close state of the light-shielding mechanism 3011 by controlling a voltage applied to the galvanometer. The light-shielding mechanism 3011 can be composed of an aperture of the imaging optical system 3010 and an open/close mechanism for opening/closing the aperture. By closing the aperture completely, the photoelectric conversion element 100 is shielded from incident light. The photoelectric conversion portion 102 can also be shielded from incident light by changing an applied voltage using a liquid crystal filter that can control light transmittance based on the applied voltage instead of changing positions or shapes of the light-shielding portion and the aperture.

The control unit 302 controls imaging. Specifically, the control unit 302 receives a user instruction and determines whether to start or end imaging. The control unit 302 also detects an image acquisition condition of the photoelectric conversion apparatus 300. The image acquisition condition is a parameter set indicating a state during imaging, such as a time, a parameter, and a temperature of the photoelectric conversion element 100.

The signal processing unit 303 acquires a signal output from the photoelectric conversion element 100 and outputs an image based on a correction value determined based on signal values of the OB pixels. The signal processing unit 303 includes a signal acquisition unit 3030 and the storage unit 305. The signal acquisition unit 3030 determines a black level correction value based on signals acquired by the photoelectric conversion apparatus 300. The storage unit 305 stores the black level correction value determined by the signal acquisition unit 3030. The signal processing unit 303 also includes an image output unit 3031. The image output unit 3031 corrects signal values of the pixels 101 that are acquired by the photoelectric conversion element 100 by using the black level correction value stored in the storage unit 305, and outputs an image.

The photoelectric conversion apparatus 300 also includes the detection unit 304. The detection unit 304 detects a change in the image acquisition condition (a change from a first condition to a second condition) of the photoelectric conversion apparatus 300. The control unit 302 detects, from image acquisition condition, internal changes in the image acquisition condition due to a change in parameters set for the photoelectric conversion apparatus 300 and external changes in the image acquisition condition due to a continuous use time and an external environment. The detection unit 304 detects, for example, a change based on a sensor temperature acquired by a thermometer of the photoelectric conversion element 100 and a change in digital gain set for the photoelectric conversion apparatus 300.

The photoelectric conversion apparatus 300 according to the present embodiment uses three types of signals in black level correction as described below. Specifically, the photoelectric conversion apparatus 300 calculates a difference between a first signal value calculated from signals of the OB pixel region 14 in a state where the light-shielding mechanism 3011 is inserted in an optical path of the imaging optical system 3010 and a second signal value calculated from signals of the effective pixel region 13. The photoelectric conversion apparatus 300 then calculates a third signal value from signals of the OB pixel region 14 in a state where the light-shielding mechanism 3011 is removed from the optical path of the imaging optical system 3010. Thereafter, the photoelectric conversion apparatus 300 calculates a black level correction value by using a fourth signal value, which is the difference between the first signal value and the second signal value, and the third signal value. This makes it possible to reduce black level deviation sufficiently even in a case where a photoelectric conversion apparatus 300 including an APD is driven for a long time.

<Flowchart>

Figure 7:
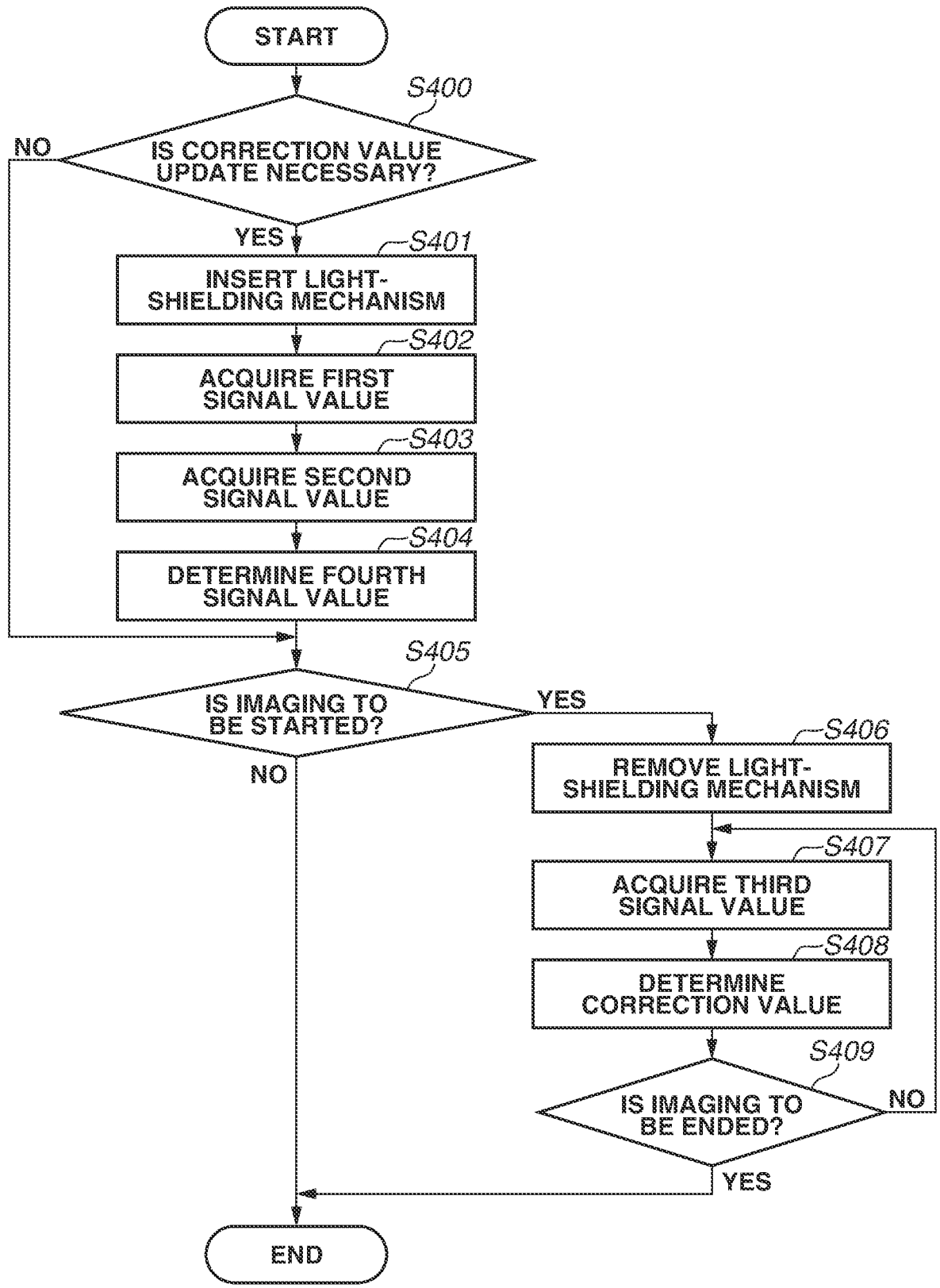
FIG. 7 is a flowchart illustrating a process that the photoelectric conversion apparatus according to the first embodiment performs.

FIG. 7 is a flowchart illustrating black level correction signal processing. The processing illustrated in the flowchart in FIG. 7 (and FIGS. 8 and 11 described below) is performed by a control unit 801 (CPU) in FIG. 12, which is a computer, based on computer programs stored in a storage unit 802. Hereinafter, the letter "S" is added at the beginning of each step number to omit the phrase "step number". The black level correction according to the present embodiment includes two phases, e.g., a preparation phase (steps S400 to S404) and a correction phase (steps S405 to S409). In the preparation phase, the light-shielding mechanism 3011 is inserted in the optical path of the imaging optical system 3010, and data for correction is acquired. In the correction phase, correction processing is performed during captured image acquisition. A black level correction signal processing method that is a photoelectric conversion apparatus control method will be described below.

First, the preparation phase will be described. In step S400, the control unit 302 determines whether a correction value update is necessary. In a case where it has been a while since the initial or last imaging or in a case where there has been a change in the image acquisition condition (YES in step S400), the processing proceeds to step S401. In a case where a previous correction value can be used as described below, the preparation phase can be skipped, and the processing can proceed to step S405. In step S401, the imaging unit 301 inserts the light-shielding mechanism 3011 in the optical path of the imaging optical system 3010. In step S402, the signal processing unit 303 acquires a first signal value from signals of the OB pixel region 14 in the state where the light-shielding mechanism 3011 is inserted in the optical path of the imaging optical system 3010, and stores the acquired first signal value in the storage unit 305. As the first signal value, a mean or median value of the plurality of pixels 101 of the OB pixel region 14 can be used. At this time, each pixel with a signal value differing from an expected signal value by a specific threshold or more can be excluded as a defective pixel. Alternatively, an average value of a plurality of frames can be calculated to calculate the first signal value.

In step S403, the signal processing unit 303 acquires a second signal value from signals of the effective pixel region 13 in the state where the light-shielding mechanism 3011 is inserted in the optical path of the imaging optical system 3010, and stores the acquired second signal value in the storage unit 305. As the second signal value, a mean or median value of the plurality of pixels 101 of the effective pixel region 13 can be used. Similarly to the first signal value, defective pixels can also be excluded, and an average of a plurality of frames can be calculated. Thereafter, in step S404, the signal processing unit 303 determines a fourth signal value indicating the difference between the second signal value and the first signal value. The foregoing steps are the preparation phase.

The correction phase will now be described. In step S405, the control unit 302 determines whether to start imaging. In a case where the correction value update is completed and imaging can be started (YES in step S405), the processing proceeds to step S406. In a case where a user instruction to stop imaging is issued, the process is ended. In a case where imaging is to be started, the imaging unit 301 removes the light-shielding mechanism 3011 from the optical path of the imaging optical system 3010 and starts acquiring a captured image. In step S407, the signal processing unit 303 calculates a third signal value from signals of the OB pixel region 14 during the captured image acquisition. In step S408, the signal processing unit 303 then determines a black level correction value C based on the fourth signal value and the third signal value. Specifically, the correction value C is calculated as specified below using a fourth signal value $L_{OFF}$ and a third signal value $L_{OB}$.

$$\text{Correction value } C = L_{OB} + L_{OFF} \times \alpha. \quad \text{(formula 1)}$$

In formula 1, $\alpha$ is a correction coefficient used for correcting a difference between a first image acquisition condition in the preparation phase during which the light-shielding mechanism 3011 is inserted and a second image acquisition condition in the correction phase during which the light-shielding mechanism 3011 is removed. As indicated by formula 1, the correction value C is calculated using a fifth signal value obtained by correcting the fourth signal value $L_{OFF}$ using α and the third signal value $L_{OB}$. Details of α will be described below. By subtracting the correction value C from each signal value $L_{B(X, Y)}$ of the pixels 101 of the effective pixel region 13, signal values $L_{B\_COR(X, Y)}$ of the effective pixels with corrected black levels are obtained. Specifically, the signal processing unit 303 (the image output unit 3031) corrects the signal values of the effective pixels by using the correction value C and outputs an image.

$$L_{B\_COR(X,Y)} = L_{B(X,Y)} - C. \quad \text{(formula 2)}$$

In step S409, the control unit 302 determines whether to continue the imaging. In a case where the imaging is to be continued (NO in step S409), the processing returns to step S407. In a case where a correction value update is necessary or in a case where a user instruction is issued, the processing can return to step S401. In a case where an instruction to end the imaging or in a case where the imaging is set to be performed for a predetermined time and the predetermined time elapses, the imaging is ended.

As described above, the photoelectric conversion apparatus 300 according to the present embodiment calculates the black level correction value C by using the fourth signal value and the third signal value. This makes it possible to reduce black level deviation sufficiently even in a case where the photoelectric conversion apparatus 300 is driven for a long time. Effects of the present invention will be described below by comparing with a conventional black level correction method. <Effects>

For simplification, a case where α is 1 will be described below as an example. The case where α is 1 is a case where there is no difference between the first image acquisition condition in the preparation phase during which the light-shielding mechanism 3011 is inserted and the second image acquisition condition in the correction phase during which the light-shielding mechanism 3011 is removed. A case where α is not 1 will be described below. The case where α is not 1 is a case where there is a difference between the first image acquisition condition in the preparation phase during which the light-shielding mechanism 3011 is inserted and the second image acquisition condition in the correction phase during which the light-shielding mechanism 3011 is removed.

A signal value $L_3$ of an OB pixel and a signal value $L_5$ of an effective pixel in the correction phase can be calculated as specified below using a black level $L_{OB}$ of the OB pixel, a black level $L_{EFF}$ of the effective pixel, and the number of photons $L_{PH}$ incident on the effective pixel.

$$L_3 = L_{OB}, L_5 = L_{EFF} + L_{PH}. \quad \text{(formula 3)}$$

The conventional black level correction method corrects a black level by subtracting the signal value $L_3$ of the OB pixel from the signal value $L_5$ of the effective pixel. Specifically, a corrected signal value $L_{99}$ of the effective pixel is calculated as specified below.

$$L_{99} = L_5 - L_3 = L_{EFF} + L_{PH} - L_{OFF}. \quad \text{(formula 4)}$$

As indicated by formula 4, in order for $L_{99}$ to become equal to the number of photons $L_{PH}$ incident on the effective pixel, i.e., in order to correct the black level correctly, $L_{EFF}$ and $L_{OB}$ need to be equal to each other. However, as described above, in a case where a photoelectric conversion apparatus including a photoelectric conversion element with an APD is driven for a long time, black levels of an effective pixel region with abundant incident light and OB pixels without incident light become different from each other. Thus, in a case where the conventional black level correction method is used, the difference between $L_{EFF}$ and $L_{OB}$ may increase, depending on the drive time, and it may become difficult to correct black level deviation of signals sufficiently.

In contrast, the photoelectric conversion element 100 according to the present embodiment acquires a signal value $L_1$ of the OB pixel and a signal value $L_2$ of the effective pixel in the preparation phase in addition to the signal value $L_3$ of the OB pixel in the correction phase, and performs black level correction using a difference $L_4$ between $L_2$ and $L_1$. In the case where α is 1, $L_1$ is equal to $L_{OB}$, and $L_2$ is equal to $L_{EFF}$, so that a corrected signal value $L_6$ of the effective pixel becomes as specified below.

$$L_6 = \quad \text{(formula 5)}$$
$$L_5 - (L_3 + L_2 - L_1) = L_5 - L_2 = L_{EFF} + L_{PH} - L_{EFF} = L_{PH}.$$

Specifically, by performing the correction according to the present embodiment, the number of photons $L_{PH}$ incident on the effective pixels is calculated correctly even in a case where the black levels of the effective pixel region 13 with abundant incident light and the OB pixels without incident light differ from each other.

<Correction Coefficient>

Next, the correction coefficient α for correcting the difference between the first image acquisition condition in the preparation phase during which the light-shielding mechanism 3011 is inserted and the second image acquisition condition in the correction phase during which the light-shielding mechanism 3011 is removed will be described below.

The image acquisition condition includes, for example, a time (integration time) of integrating the number of photons incident on the photoelectric conversion portions 102, a digital gain by which the integrated number of photons is to be multiplied, and a temperature of the photoelectric conversion element 100. While a dark current value changes depending on the integration time, the digital gain, and the temperature of the photoelectric conversion element 100, the difference in dark current between the first image acquisition condition in the preparation phase and the second image acquisition condition in the correction phase is corrected by using α. The detection unit 304 detects a change in the image acquisition condition of the photoelectric conversion apparatus 300 including the photoelectric conversion element 100. The detection unit 304 can also be configured to detect a change in the image acquisition condition in a case where an image processing parameter such as digital gain is controlled by the control unit 302.

A difference $L_{OFF(preparation)}$ between a black level $L_{OB}$ of the OB pixel and a black level $L_{EFF}$ of the effective pixel in the preparation phase is as specified below.

$$L_{OFF(preparation)} = L_{EFF} - L_{OB}. \quad \text{(formula 6)}$$

Since the dark current is proportional to the integration time and the digital gain, a difference $L_{OFF(correction)}$ in black level in the correction phase with respect to the difference $L_{OFF}$ between the effective pixel and the OB pixel is as specified below.

$$L_{OFF(correction)} = L_{OFF(preparation)} \times (T_O \times D_O)/(T_P \times D_P). \quad \text{(formula 7)}$$

In formula 7, $T_O$ and $D_O$ are the integration time and the digital gain in the preparation phase, respectively, and $T_P$ and $D_P$ are the integration time and the digital gain in the preparation phase, respectively. Thus, the correction coefficient α is calculated as specified below.

$$\alpha = (T_O \times D_O)/(T_P \times D_P). \quad \text{(formula 8)}$$

While the correction of the differences in the integration time and the digital gain is described above, it is more desirable to calculate the correction coefficient considering a difference in the temperature of the photoelectric conversion element 100 between the preparation phase and the correction phase.

The reason is as follows. In general, the higher the temperature, the greater the dark current, i.e., the dark current has temperature dependency, which may differ depending on characteristics of the APDs used in the photoelectric conversion element 100.

As described above, use of the correction coefficient α makes it possible to reduce black level deviation while considering the difference in dark current between the first image acquisition condition in the preparation phase and the second image acquisition condition in the correction phase. Specifically, by calculating the black level correction value based on the fifth signal value obtained by correcting the fourth signal value by using α and the third signal value, it becomes possible to reduce black level deviation while considering the difference in dark current between the first image acquisition condition and the second image acquisition condition.

In general, optimal values of the integration time and the digital gain used in the correction phase vary depending on a subject to be imaged in the correction phase, so that the integration time and the digital gain used in the correction phase are not always the same as the integration time and the digital gain used in the preparation phase. Use of the correction coefficient α is desirable because this makes it possible to reduce black level deviation while using the integration time and the digital gain that are optimal for the subject to be imaged in the correction phase.

<Variation 1>

In a case where the pixels 101 of the photoelectric conversion element 100 include an on-chip color filter and the photoelectric conversion apparatus 300 is capable of acquiring color information, signal values of the OB pixels and the effective pixels can be acquired for each color channel in steps S402, S403, and S406. As described above, the greater the amount of incident light, the higher the possibility that a large amount of dark current flows. In imaging an ordinary subject, the amount of light incident on green pixels is greater than the amounts of light incident on red and blue pixels, so that the possibility of a significant increase in dark current is higher in the green pixels than in the red and blue pixels. By calculating the signal values for each color channel, it becomes possible to reduce black level deviation due to a difference in dark current increase between the color channels. Specifically, a first signal value is acquired for each of the red, blue, and green pixels from the OB pixels in the shielded state. Similarly, a second signal value is acquired for each of the red, blue, and green pixels from the effective pixels in the shielded state. Furthermore, a third signal value is acquired for each of the red, blue, and green pixels from the OB pixels in the light incident state. From the acquired signal values, a correction value is calculated for each color.

As described above, in a photoelectric conversion apparatus including an APD, the greater the amount of light incident on the APD, the larger the avalanche current that flows, so that a new trap level may occur in the pixels 101. Since characteristics of the new trap level that occurs in a case where the photoelectric conversion apparatus is driven for a long time are not always the same as characteristics of a trap level causing a dark current before the photoelectric conversion apparatus is driven, so that the temperature dependency of the dark current may differ. Thus, in a case where the photoelectric conversion apparatus is driven for a long time, the temperature dependency of the dark current may change due to the drive time.

Thus, a photoelectric conversion apparatus according to a second embodiment calculates a plurality of fourth signal values at different temperatures in the preparation phase to correct black level deviation while considering a change in the temperature dependency of the dark current due to the driving of the photoelectric conversion apparatus. The photoelectric conversion apparatus has a functional configuration and a hardware configuration that are basically the same as those according to the first embodiment, and only differences will be described below.

According to the present embodiment, the control unit 302 controls the temperature of the photoelectric conversion apparatus. The temperature control includes, for example, acquisition of a measurement value (temperature) of the thermometer, activation of a temperature control unit (cooling device), and cooling level control. As the temperature control unit, a Peltier element, a heater, and/or a fan can be used.

Figure 8:
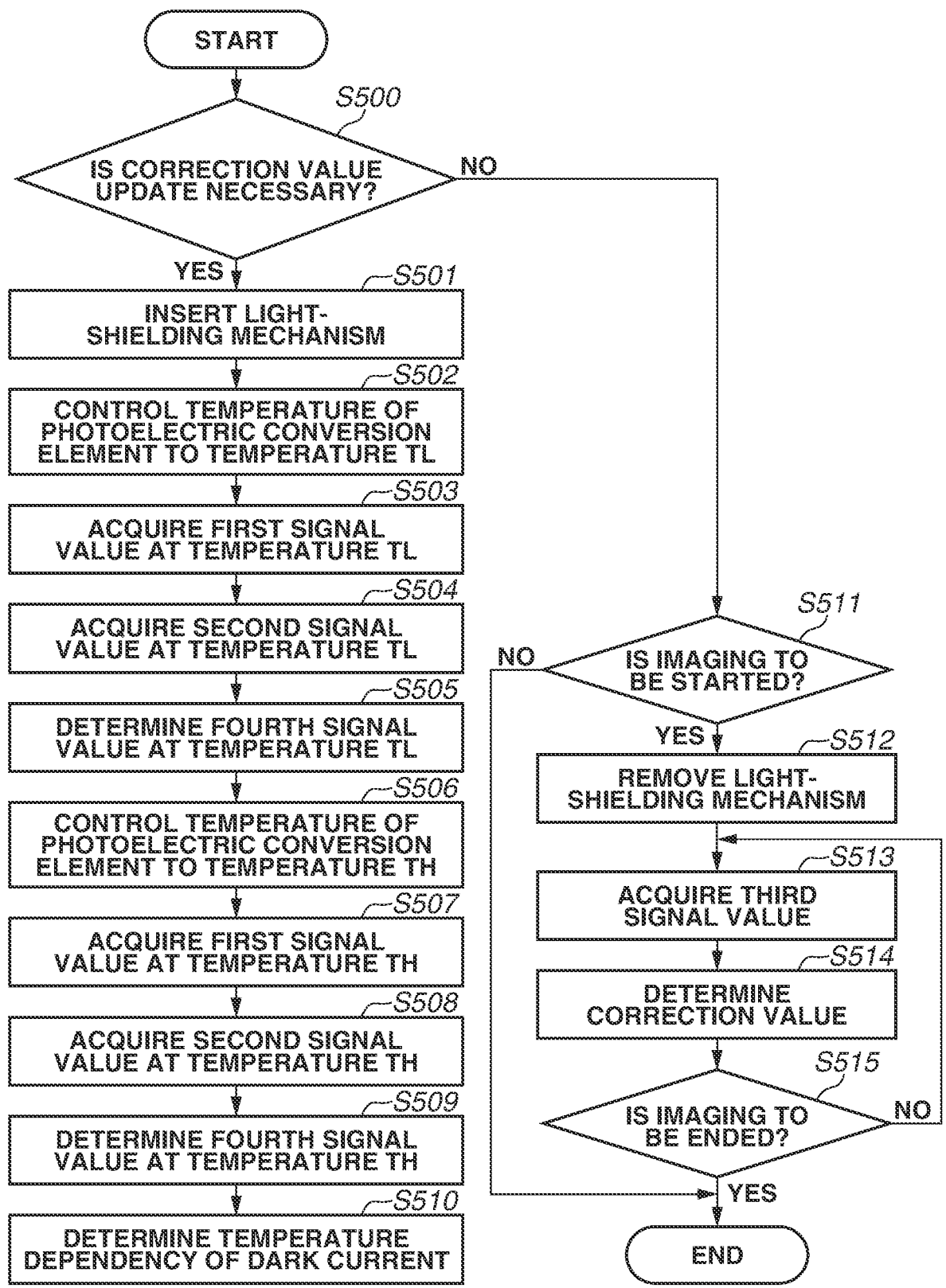
FIG. 8 is a flowchart illustrating a process that a photoelectric conversion apparatus according to a second embodiment performs.

FIG. 8 is a flowchart illustrating a black level correction signal process according to the second embodiment.

In step S500, the control unit 302 determines whether a correction value update is necessary. In a case where it has been a while since the initial or last imaging or in a case where there has been a change in the image acquisition condition (YES in step S500), the processing proceeds to step S501. In a case where a previous correction value can be used as described below, the preparation phase can be skipped, and the processing can proceed to step S511. In step S501, the imaging unit 301 inserts the light-shielding mechanism 3011 in the optical path of the imaging optical system 3010. In step S502, the control unit 302 controls the temperature of the photoelectric conversion element 100 to a first temperature TL. After the temperature of the photoelectric conversion element 100 reaches the first temperature TL, the signal processing unit 303 acquires, in step S502 to 504, a first signal value from signals of the OB pixel region 14 at the temperature TL and a second signal value from signals of the effective pixels at the temperature TL, as in steps S402 to S404 in FIG. 7. The signal processing unit 303 then determines a fourth signal value at the temperature TL based on the difference between the first signal value and the second signal value.

In step S506, the control unit 302 controls the temperature of the photoelectric conversion element 100 to a second temperature TH higher than the first temperature TL. After the temperature of the photoelectric conversion element 100 reaches the second temperature TH, the signal processing unit 303 acquires, in steps S507 to S509, a first signal value at the temperature TH from signals of the OB pixel region 14 and a second signal value at the temperature TH from signals of the effective pixels, as in steps S402 to S404 in FIG. 7. The signal processing unit 303 then determines a fourth signal value at the temperature TH based on the difference between the first signal value and the second signal value at the temperature TH. Lastly, in step S510, the signal processing unit 303 determines a dark current temperature dependency coefficient β based on the second signal value at the temperature TL that is acquired in step S504 and the second signal value at the temperature TH that is acquired in step S508. It is known that in general, a dark current temperature dependency can be approximated by the following Arrhenius equation:

$$\text{Dark Current} = \beta \times \exp\left(\frac{-1}{kT}\right), \quad \text{(formula 9)}$$

where T is a temperature and k is the Boltzmann constant.
<Calculation of β>

Thus, the dark current temperature dependency coefficient β is calculated as specified below:

$$\beta = \frac{\ln(L\_EFF\_TH - L\_EFF\_TL)}{\frac{1}{k \times TL} - \frac{1}{k \times TH}}, \quad \text{(formula 10)}$$

where $L_{EFF\_TL}$ is the second signal value at the temperature TL, and $L_{EFF\_TH}$ is the second signal value at the temperature TH.

As described above, the photoelectric conversion apparatus according to the second embodiment calculates the second signal values at the plurality of different temperatures in the preparation phase to calculate the dark current temperature dependency coefficient β after the photoelectric conversion apparatus is driven. This makes it possible to correct black level deviation considering a change in dark current temperature dependency due to the driving of the photoelectric conversion apparatus.

The correction phase is similar to steps S405 to S409 in FIG. 7. Specifically, in step S511, the control unit 302 determines whether to start imaging. In a case where imaging is to be started (YES in step S511), the processing proceeds to step S512. In a case where imaging is not to be started (NO in step S511), the process is ended. In step S512, the imaging unit 301 removes the light-shielding mechanism 3011 and starts imaging. In step S513, the signal processing unit 303 calculates a third signal value from signals of the OB pixel region 14. At this time, the control unit 302 acquires the temperature of the photoelectric conversion element 100. In step S514, the signal processing unit 303 acquires a correction value based on the temperature of the photoelectric conversion element 100, the fourth signal value, the third signal value, and the dark current temperature dependency coefficient β. The signal processing unit 303 corrects signal values of the effective pixels using the correction value and outputs an image.

<Modified Example: Execution Condition Setting>

While steps S501 to S504 for calculating signal values at the temperature TL and steps S507 to S509 for calculating signal values at the temperature TH are performed consecutively in FIG. 8, the steps at the temperature TL and the steps at the temperature TH can be performed separately. In this case, the control unit 302 performs control such that the acquisition of the first signal values of the OB pixels and the acquisition of the second signal values of the effective pixels are performed under an execution condition set by a user. In this case, step S506 can be changed to processing of determining whether the control unit 302 satisfies the set execution condition. The control unit 302 also acquires the signal values at the predetermined temperatures set by the user in a case where each predetermined temperature is reached. Alternatively, the condition set by the user can be not time but temperature. Designating a temperature as the condition is desirable because this makes it possible to acquire signals for correction at the same temperature every time. At this time, for example, two different values such as 20 degrees and 40 degrees can also be set.

In general, it takes a time of about several minutes for a temperature control unit to change the temperature, depending on a type of the temperature control unit. Thus, in a case where steps S504 and S505 are performed consecutively, a normal captured image cannot be acquired for several minutes. In contrast, in a case where the light-shielding mechanism 3011 is removed in step S504 and step S505 and the subsequent steps are performed after the temperature reaches TH, a normal captured image can be acquired during the several minutes between steps S504 and S505. This is thus desirable because the time during which captured images cannot be acquired is reduced.

The control unit 302 can acquire the first signal values and the second signal values using a time set by the user as a trigger. While the photoelectric conversion apparatus includes the temperature control unit and the temperature of the photoelectric conversion element 100 is controlled to TL and TH in the example illustrated in FIG. 8, the temperature control unit does not necessarily have to be included in the photoelectric conversion apparatus. For example, in a case where the photoelectric conversion apparatus is used for monitoring an outside location, the photoelectric conversion apparatus is typically used continuously for 24 hours a day, so that the temperature of the photoelectric conversion apparatus may vary between daytime and nighttime. Thus, signals at relatively low temperature can be acquired during nighttime while signals at relatively high temperature can be acquired during daytime by using the temperature difference between daytime and nighttime.

Figure 9:
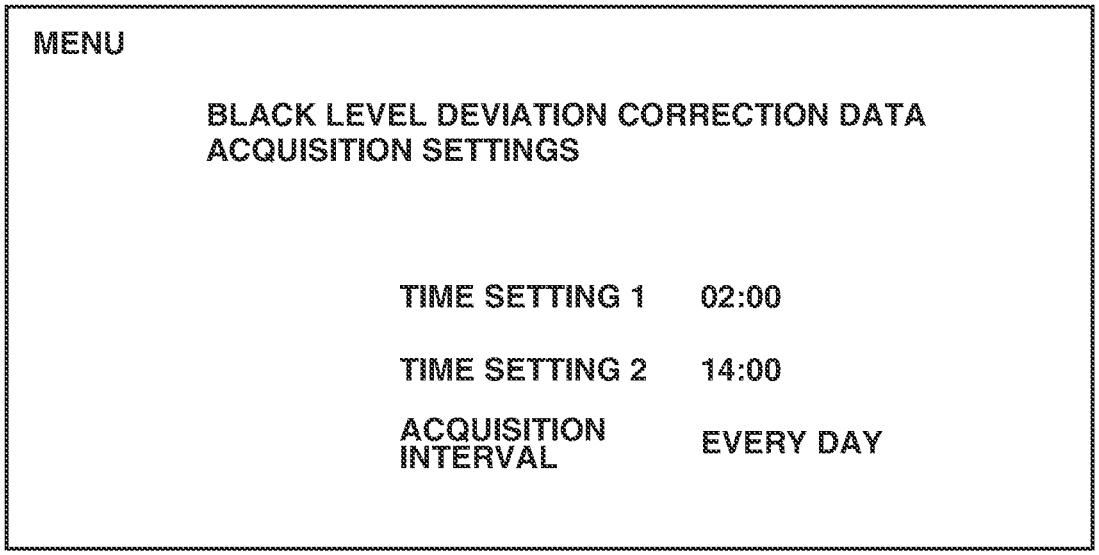
FIG. 9 illustrates a setting screen of the photoelectric conversion apparatus according to the second embodiment.

A specific example will now be described. FIG. 9 illustrates a setting screen for acquiring the dark current temperature dependency in a case where the photoelectric conversion apparatus is used for monitoring. The photoelectric conversion apparatus illustrated in FIG. 9 is configured to acquire first signal values and second signal values for correction at predetermined times every day. Specifically, in the photoelectric conversion apparatus illustrated in FIG. 9, the control unit 302 performs control such that the acquisition of the first signal values from the OB pixels and the acquisition of the second signal values from the effective pixels are performed under the execution condition (predetermined time) set by the user. In the example illustrated in FIG. 9, the acquisition of data for correction is set to be performed at 2:00 during nighttime at which the temperature is relatively low and at 14:00 during daytime at which the temperature is relatively high. The photoelectric conversion apparatus inserts the light-shielding mechanism 3011 automatically at the times set in FIG. 9 and performs steps S501 to S505 during nighttime and steps S507 to S509 during daytime. In this case, step S506 is skipped.

FIGS. 10A to 10C illustrate a flow of updating the value of the dark current temperature dependency coefficient β. As illustrated in FIG. 10A, the photoelectric conversion apparatus stores a second signal value $L_{EFF\_TL0}$ at a temperature $TL_0$ and a second signal value $L_{EFF\_TH0}$ at a temperature $TH_0$ in advance. Thus, an initial value $\beta_0$ of the current temperature dependency coefficient is calculated as specified below.

$$\beta 0 = \frac{\ln(L\_EFF\_TH0 - L\_EFF\_TL0)}{\frac{1}{k \times TL_0} - \frac{1}{k \times TH_0}}. \quad \text{(formula 11)}$$

As illustrated in FIG. 10B, in a case where steps S501 to S505 are performed during nighttime, a second signal value $L_{EFF\_TL1}$ at a temperature TL1 is acquired. At this time, $L_{EFF\_TL0}$ is updated to $L_{EFF\_TL1}$, and a dark current temperature dependency coefficient $\beta_1$ is obtained.

$$\beta 1 = \frac{\ln(L\_EFF\_TH0 - L\_EFF\_TL1)}{\frac{1}{k \times TL_1} - \frac{1}{k \times TH_0}}. \quad \text{(formula 12)}$$

As illustrated in FIG. 10C, in a case where steps S507 to S509 are performed during daytime, a second signal value $L_{EFF\_TH1}$ at a temperature TH1 is acquired. Similarly, $L_{EFF\_TH0}$ is updated to $L_{EFF\_TH1}$, and a dark current temperature dependency coefficient $\beta_2$ is obtained.

$$\beta 2 = \frac{\ln(L\_EFF\_TH1 - L\_EFF\_TL1)}{\frac{1}{k \times TL_1} - \frac{1}{k \times TH_1}}. \quad \text{(formula 13)}$$

As described above, as the drive time of the photoelectric conversion apparatus increases, the dark current temperature dependency coefficient is updated periodically. This makes it possible to correct black level deviation regardless of the drive time of the photoelectric conversion apparatus considering a change in the dark current temperature dependency.

While the acquisition of data for correction is set to be performed at the set times every day in the example illustrated in FIG. 9, the setting does not have to be every day and can be weekly, monthly, or yearly. Alternatively, three or more times to acquire signals for correction can be set instead of the two types that are daytime and nighttime, or the user can be allowed to acquire a signal for correction at a desired time.

In a case where the photoelectric conversion element 100 includes no temperature control unit and acquires signals for correction using a change in ambient temperature, especially in a case where the condition set by the user is not temperature but time, the temperature of the photoelectric conversion element 100 at the time of acquiring a signal may not be always the same every time. Thus, in a case where the temperature of the photoelectric conversion element 100 at the time of acquiring a signal is higher than or equal to a threshold, the second signal value ($L_{EFF\_TH1}$) at high temperature is desirably updated, whereas in a case where the temperature is lower than the threshold, the second signal value ($L_{EFF\_TL1}$) at low temperature is desirably updated. Especially in a case where the user acquires a signal for correction at a desired time, since the temperature of the photoelectric conversion element 100 cannot be acquired, it is desirable to automatically change the second signal value to be updated based on the threshold. Specifically, data for correction is desirably classified according to the temperature of the photoelectric conversion element 100 at the time of execution under the condition set by the user, and the classified data is desirably stored separately as data for each temperature. The control unit 302 determines whether the temperature of the photoelectric conversion element 100 at the time set by the user is higher than or equal to the threshold, and in a case where the temperature is higher than or equal to the threshold, the signal processing unit 303 acquires the second signal value at the high temperature. In a case where the temperature is lower than the threshold, the signal processing unit 303 acquires the second signal value at the low temperature.

<Correction of Difference in Black Level for Each Pixel>

As described above, in a photoelectric conversion apparatus including an APD, the greater the amount of light incident on the APD, the larger the avalanche current that flows, so that a new trap level may occur in the pixels 101. Thus, in a case where the photoelectric conversion apparatus is used as a monitoring camera for fixed-point monitoring of a specific location, a dark current increase ratio may be higher in pixels with abundant incident light than in pixels with less incident light. Specifically, the black level may vary from pixel to pixel.

Thus, a photoelectric conversion apparatus according to a third embodiment acquires a second signal value for each pixel and performs correction to reduce differences between the black levels of the pixels. The photoelectric conversion apparatus has a functional configuration and a hardware configuration that are basically the same as those according to the first embodiment, and only differences will be described below.

Figure 11:
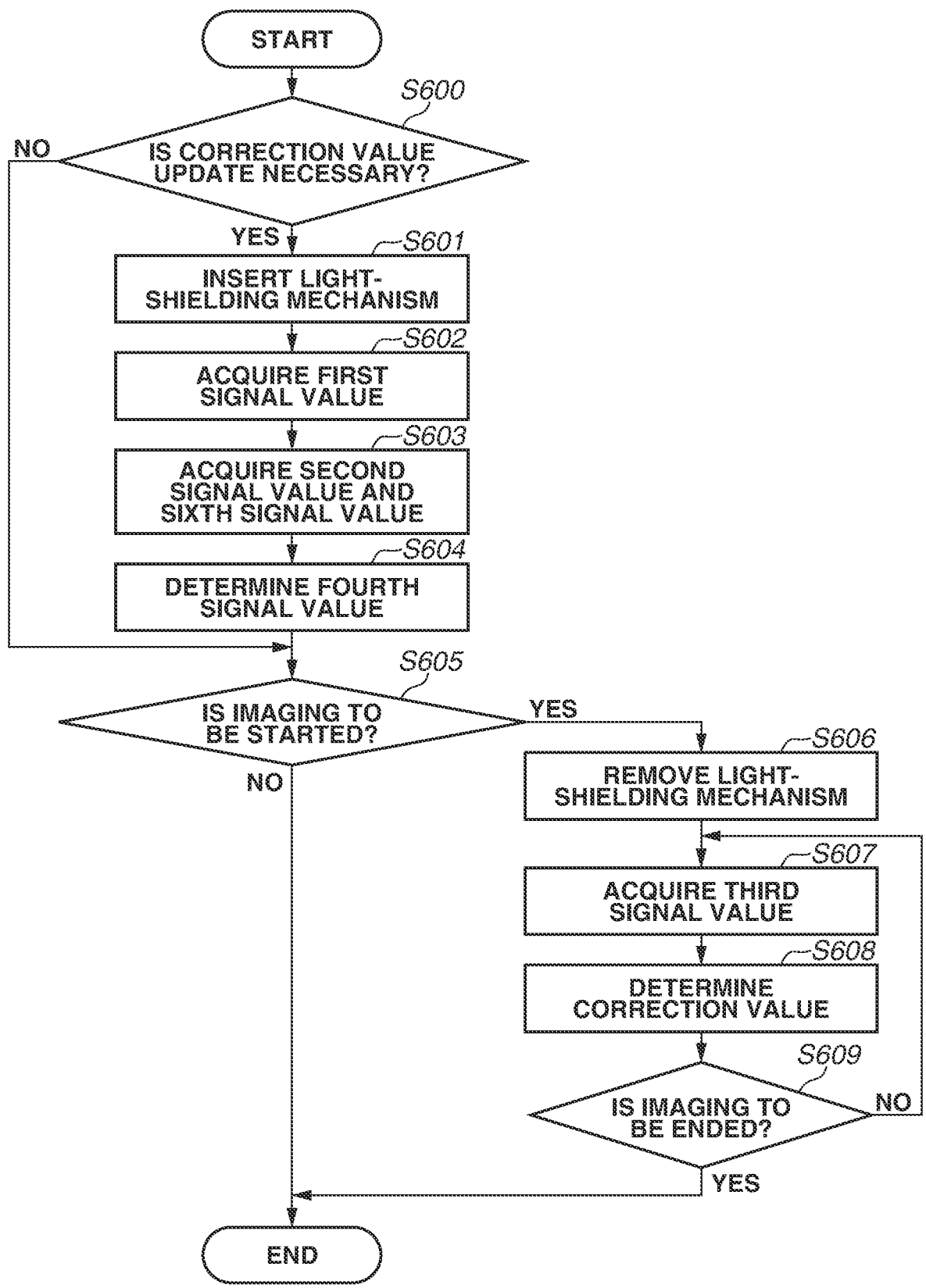
FIG. 11 is a flowchart illustrating a process that a photoelectric conversion apparatus according to a third embodiment performs.

FIG. 11 is a flowchart illustrating a black level correction signal process according to the third embodiment. In step S600, the control unit 302 determines whether a correction value update is necessary. In a case where a correction value update is to be performed (YES in step S600), the processing proceeds to step S601, whereas in a case where no update is to be performed (NO in step S600), the processing proceeds to step S605. In step S601, the imaging unit 301 inserts the light-shielding mechanism 3011 in the optical path of the imaging optical system 3010. The signal processing unit 303 then acquires, in step S602, a first signal value from signals of the OB pixel region 14 using the signal acquisition unit 3030 in the state where the light-shielding mechanism 3011 is inserted in the optical path of the imaging optical system 3010, and stores the acquired first signal value in the storage unit 305. In step S603, the signal processing unit 303 acquires a second signal value from signals of the effective pixel region 13 using the signal acquisition unit 3030 in the state where the light-shielding mechanism 3011 is inserted in the optical path of the imaging optical system 3010, and stores the acquired second signal value in the storage unit 305. At this time, the signal processing unit 303 acquires a mean value of the plurality of pixels 101 of the effective pixel region 13 as the second signal value and a sixth signal value for each pixel 101 of the effective pixel region 13 and stores the acquired second signal value and the acquired sixth signal values in the storage unit 305. Thereafter, in step S604, the signal processing unit 303 determines a fourth signal value obtained by subtracting the first signal value from the second signal value. The foregoing steps are the preparation phase.

The correction phase will now be described. In step S605, the control unit 302 determines whether to start imaging. In a case where imaging is to be started (YES in step S605), the processing proceeds to step S606, whereas in a case where imaging is not to be started (NO in step S605), the process is ended. In step S606, the imaging unit 301 removes the light-shielding mechanism 3011 from the optical path of the imaging optical system 3010 and starts acquiring a captured image. In step S607, the signal processing unit 303 acquires a third signal value from signals of the OB pixel region 14 during the captured image acquisition. In step S608, the signal processing unit 303 determines a correction value based on the sixth signal value, the fourth signal value, and the third signal value. Specifically, the correction value C is calculated as specified below using a sixth signal value $L_{D(X,Y)}$, a fourth signal value $L_{OFF}$, and a third signal value $L_{OB}$.

$$L_{B\_COR} = L_{B(X,Y)} - C1 - C2(X, Y). \quad \text{(formula 14)}$$

$$C1 = L_{OB} + L_{OFF} \times \alpha 1. \quad \text{(formula 15)}$$

$$C2(X, Y) = L_{D(X,Y)} \times \alpha 2. \quad \text{(formula 16)}$$

In the formulas, $\alpha 1$ and $\alpha 2$ are correction coefficients for correcting a difference between the image acquisition condition in the preparation phase during which the light-shielding mechanism 3011 is inserted and the image acquisition condition in the correction phase during which the light-shielding mechanism 3011 is removed. As described above, not only the third signal value and the fourth signal value but also the sixth signal value for each pixel 101 of the effective pixel region 13 are used. This makes it possible to correct black level deviation also considering a change in dark current in each pixel 101. In step S609, the control unit 302 determines whether to continue the imaging. In a case where the imaging is to be continued (NO in step S609), the processing returns to step S607.

While the sixth signal value is calculated for each pixel 101, the sixth signal value can also be calculated for each region cropped to a predetermined size from an image region. In this case, the image processing load is reduced compared to the case of performing the calculation for each pixel 101.

<Photoelectric Conversion System>

Figure 12:
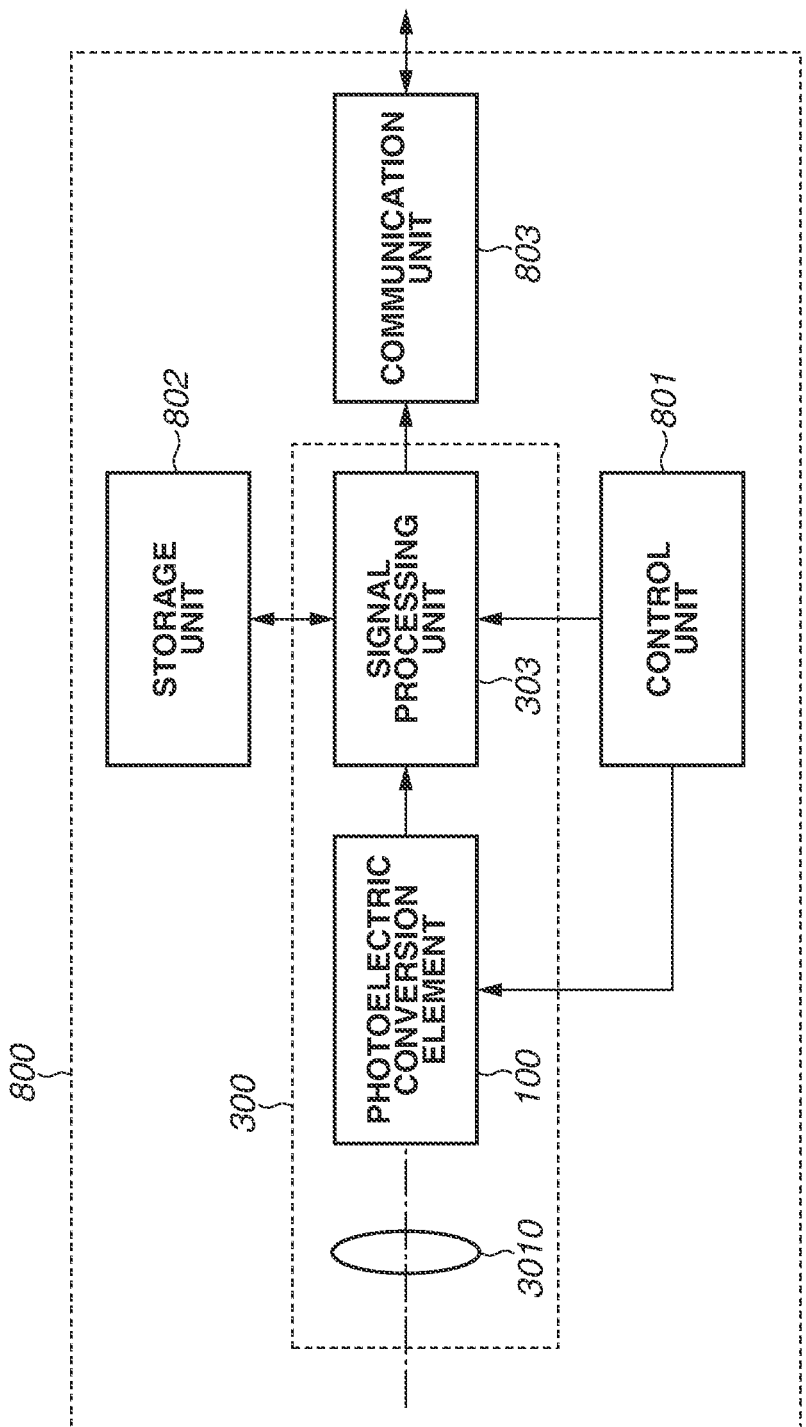
FIG. 12 is a block diagram illustrating an example of a functional configuration of a photoelectric conversion system.

FIG. 12 is a system block diagram illustrating a photoelectric conversion system using the photoelectric conversion apparatus according to any one of the first to third embodiments. A photoelectric conversion system 800 includes the photoelectric conversion apparatus 300 including the photoelectric conversion element 100, the control unit 801, the storage unit 802, and a communication unit 803.

The photoelectric conversion element 100 captures an optical image formed by an imaging optical system 3010. A signal read from the photoelectric conversion element 100 undergoes processing by the signal processing unit 303, such as image generation, first correction processing, second correction processing, black level correction, gamma curve adjustment, noise reduction, and data compression processing, and a final image is generated. In a case where the photoelectric conversion element 100 includes a red-green-blue (RGB) on-chip color filter, it is desirable to further perform white balance correction and color conversion processing.

The control unit 801 includes a CPU as a computer therein and functions as a control unit that controls operations of components of the entire photoelectric conversion apparatus 300 based on computer programs stored in a memory as a storage medium. The control unit 801 controls the length of an exposure period of each frame of the photoelectric conversion element 100 via the control pulse generation portion 115 of the photoelectric conversion element 100 and controls the insertion and removal of the light-shielding mechanism 3011.

The storage unit 802 includes, for example, a recording medium, such as a memory card and a hard disk. The communication unit 803 includes a wireless interface and/or a wired interface, outputs generated images to the outside of the photoelectric conversion system 800, and receives signals from the outside.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform one or more functions of one or more of the above-described embodiment(s) and/or that includes one or more circuits (e.g., application specific integrated circuit (ASIC)) for performing one or more functions of one or more of the above-described embodiment(s), and by a method performed by the computer of the system or apparatus by, for example, reading out and executing the computer executable instructions from the storage medium to perform one or more functions of one or more of the above-described embodiment(s) and/or controlling the one or more circuits to perform one or more functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2023-029888, filed Feb. 28, 2023, which is hereby incorporated by reference herein in its entirety.

What is claimed is:

1. A photoelectric conversion apparatus comprising:
a photoelectric conversion element including a plurality of pixels composed of an avalanche photodiode, the plurality of pixels including an effective pixel configured to receive light and an optical black pixel shielded from light;
at least one processor; and
a memory coupled to the at least one processor, the memory storing instructions that, when executed by the at least one processor, cause the at least one processor to:
determine a correction value for correcting a signal value of the effective pixel based on a signal acquired from the optical black pixel; and
output an image using the correction value,
wherein the correction value is determined based on
a third signal value indicating a signal value of the optical black pixel in a state where the light-shielding portion is removed from the optical path of the imaging optical system, and
based on a difference between a first signal value indicating a signal value of the optical black pixel in a state where a light-shielding portion is inserted in an optical path of an imaging optical system and a second signal value indicating a signal value of the effective pixel.

2. The photoelectric conversion apparatus according to claim 1,
wherein the instructions cause the at least one processor to detect a first condition in the state where the light-shielding portion is inserted in the optical path of the imaging optical system and a second condition in the state where the light-shielding portion is removed from the optical path of the imaging optical system, and
wherein, in a case where the first condition and the second condition differ from each other, the correction value is determined based on a fifth signal value obtained by correcting a fourth signal value indicating the difference between the first signal value and the second signal value by using a correction coefficient for correcting a difference between the first condition and the second condition.

3. The photoelectric conversion apparatus according to claim 2, wherein the first condition and the second condition indicate at least one of an integration time to integrate the number of photons incident on the pixel of the photoelectric conversion element and a digital gain by which the integrated number of photons is to be multiplied.

4. The photoelectric conversion apparatus according to claim 2, wherein the first condition and the second condition indicate a temperature of the photoelectric conversion element.

5. The photoelectric conversion apparatus according to claim 1,
wherein the photoelectric conversion element includes an on-chip color filter, and
wherein the first signal value, the second signal value, and the third signal value are acquired for each color channel.

6. The photoelectric conversion apparatus according to claim 2, wherein the correction value is determined using the correction coefficient obtained by using the second signal value at a first temperature and the second signal value at a second temperature higher than the first temperature.

7. The photoelectric conversion apparatus according to claim 6, wherein the light-shielding portion is removed and a normal captured image is output during a period between acquiring the second signal value at the first temperature and acquiring the second signal value at the second temperature.

8. The photoelectric conversion apparatus according to claim 6, wherein the instructions cause the at least one processor to perform control so that the first signal value and the second signal value are acquired in an execution condition set by a user.

9. The photoelectric conversion apparatus according to claim 8, wherein, in a case where the execution condition is time, the instructions cause the at least one processor to perform control so that the first signal value and the second signal value are acquired by using the time set by the user as a trigger.

10. The photoelectric conversion apparatus according to claim 9,
wherein the instructions cause the at least one processor to determine whether a temperature of the photoelectric conversion element at the time set by the user is higher than or equal to a threshold, and
wherein, in a case where the temperature is higher than or equal to the threshold, the second signal value at a high temperature is acquired, whereas in a case where the temperature is lower than the threshold, the second signal value at a low temperature is acquired.

11. The photoelectric conversion apparatus according to claim 1, wherein the correction value is determined further using a signal value of each pixel of the effective pixel in the state where the light-shielding portion is inserted in the optical path of the imaging optical system.

12. A method for controlling a photoelectric conversion apparatus including a photoelectric conversion element including a plurality of pixels composed of an avalanche photodiode, the plurality of pixels including an effective pixel configured to receive light and an optical black pixel shielded from light, the method comprising:
determining a correction value for correcting a signal value of the effective pixel based on a signal acquired from the optical black pixel; and
outputting an image based on the correction value,
wherein the correction value is determined based on
a third signal value indicating a signal value of the optical black pixel in a state where the light-shielding portion is removed from the optical path of the imaging optical system, and
based on a difference between a first signal value indicating a signal value of the optical black pixel in a state where a light-shielding portion is inserted in an optical path of an imaging optical system and a second signal value indicating a signal value of the effective pixel.

13. A non-transitory computer-readable storage medium storing a program for causing a computer to execute a method for controlling a photoelectric conversion apparatus including a photoelectric conversion element including a plurality of pixels composed of an avalanche photodiode, the plurality of pixels including an effective pixel configured to receive light and an optical black pixel shielded from light, the method comprising:
determining a correction value for correcting a signal value of the effective pixel based on a signal acquired from the optical black pixel; and
outputting an image based on the correction value,
wherein the correction value is determined based on
a third signal value indicating a signal value of the optical black pixel in a state where the light-shielding portion is removed from the optical path of the imaging optical system, and based on a difference between a first signal value indicating a signal value of the optical black pixel in a state where a light-shielding portion is inserted in an optical path of an imaging optical system and a second signal value indicating a signal value of the effective pixel.

* * * * *